United States Patent [19]

Machnee

[11] Patent Number: 4,500,105
[45] Date of Patent: Feb. 19, 1985

[54] AGRICULTURAL IMPLEMENT HITCH ASSEMBLY

[75] Inventor: Cecil B. Machnee, Yorkton, Canada

[73] Assignee: Morris Rod-Weeder Company, Limited, Yorkton, Canada

[21] Appl. No.: 495,275

[22] Filed: May 16, 1983

[30] Foreign Application Priority Data

Jun. 15, 1982 [CA] Canada ................................. 405169

[51] Int. Cl.³ ............................................. B60D 1/00
[52] U.S. Cl. .................................. 280/468; 172/248; 172/677; 280/408; 280/411 C
[58] Field of Search .................. 280/468, 408, 411 R, 280/411 C, 460 A, 461 A, 446 R, 446 A; 172/248, 679, 677, 680

[56] References Cited

U.S. PATENT DOCUMENTS 2,516,813  7/1950  Valin ............................. 280/408 UX
3,784,229  1/1974  Seifert, Jr. ..................... 280/446 R
3,838,871  10/1974 Seifert, Jr. ..................... 280/446 R

FOREIGN PATENT DOCUMENTS 139204  6/1948  Australia ......................... 280/446 R Primary Examiner—Joseph F. Peters, Jr.
Assistant Examiner—Mitchell J. Hill
Attorney, Agent, or Firm—Jones, Tullar & Cooper

[57] ABSTRACT

The invention relates to a new hitch or drawbar assembly for use with agricultural implements towed in a train of implements behind a tractor or the like. The assembly includes a drawbar that is shorter than normal and is pivotally connected to a primary unit, such as a cultivator, for adjustable pivoting action about a horizontal axis. The drawbar is connectable to a towing or intermediate unit on or closely adjacent to the axis of the ground-engaging wheels of the intermediate unit. That connection point is also on or closely adjacent to a reaction line drawn between the connection point of the intermediate unit and the ground-engaging area of implements carried by the primary unit. As a consequence, the turning radius of the train is decreased; the primary unit is better able to follow undulating terrain, thereby maintaining a more consistent working depth for its implements; and vertical loads transferred back from the primary unit to the intermediate unit are lessened, thereby reducing wear on its wheels and associated running gear.

19 Claims, 4 Drawing Figures

AGRICULTURAL IMPLEMENT HITCH ASSEMBLY

This invention relates to hitches in general and, in particular, to a new hitch arrangement for connecting together agricultural implements in a train of such implements.

BACKGROUND TO THE INVENTION

When working the earth, especially at planting time, it is not uncommon for a farmer to connect together various implements, one after the other, in a "train" of implements. For example, at the head of a train would be the tractor, which in turn could be followed by a seeder trailer carrying a pneumatic seed distributor, the trailer towing a cultivator carrying cultivator shanks and pneumatic seed drills, and the cultivator towing a fertilizer applicator or spreader. Needless to say, any number of implements could make up the train, the foregoing being but one suggestion.

In the past, implements in a train have been simply connected together with little or no regard to the effects of the hitching systems used. This has led to the trains being very long and, therefore, being very cumbersome. The operator of the train would have difficulty in viewing and appreciating the action of the rearmost units of the train. Also, problems exist in making short-radius turns since long hitch systems tend to increase the turning circle diameter of a train of implements. Furthermore, long hitch systems make it difficult for a towed unit to follow the undulations in the ground uniformly and, in the case of a cultivator, there is thus difficulty in maintaining a uniform working depth. Problems in maintaining a uniform working depth are compounded by the lever action of a long hitch system over rolling terrain. One other problem of long hitch systems results from the vertical load transferred from the ground working implement, such as the cultivator, to the intermediate unit(s). The increase in vertical load on the intermediate unit(s) is transferred to the wheels and supports of such intermediate unit(s) and the obvious result is increased wear thereof.

There have been several attempts at improving hitching systems, as for example by providing means for varying the vertical height of implements towed by a tractor (Canadian Pat. No. 707,124 of Apr. 6, 1965 to Albert M. Jongeneel); by providing means for adapting one type of hitch system to another type of system (Canadian Pat. No. 878,248 of Aug. 17, 1971 to Massey-Ferguson, Inc.); and by varying the horizontal levelling relationship between implements in a train of implements (Canadian Pat. No. 1,104,427 of July 7, 1981 to Prasco Super Seeder Ltd.). None of these patents discloses a hitching system which overcomes the problems enumerated above.

SUMMARY OF THE INVENTION

The present invention is particularly directed to a hitching system or assembly for use in connecting together units of a train of agricultural implements. The actual hitch is considerably shorter than hitches previously used and is connected in such a manner as to reduce loads on the towing implement and to enable the towed implement to more closely follow the undulations of rolling terrain. This coupling location when taken with the shorter lever arm of the hitch itself results in the towed implement being able to maintain a more consistent working depth of any ground working implement carried thereby. Also the tractor operator can more readily discern the action of the towed implements and he can effect turns of shorter radius than before or use longer trains.

Broadly speaking therefore the present invention may be considered as providing a hitch assembly for use in connecting a primary wheeled unit to an intermediate wheeled unit in a train of units, the intermediate unit including a pair of ground engaging wheels rotatable about a first transverse axis, and the primary unit including a frame mounting at least one ground-engaging element and a pair of ground-engaging wheels rotatable about a second transverse axis, the assembly comprising: drawbar means pivotally connected at one end to the frame and having connection means at the other end thereof for pivotable connection to the intermediate unit at a point which is both on or closely adjacent to the first axis and is located on or closely adjacent to a reaction line drawn from a connection point for the intermediate unit in the train to the ground-engagement area of the element; fixed link means extending vertically from the frame; and adjustable link means pivotally connected to the drawbar means and to the fixed link means for fixing the angular relation between the frame and the drawbar means.

DESCRIPTION OF THE PREFERRED EMBODIMENT

Figure 1:
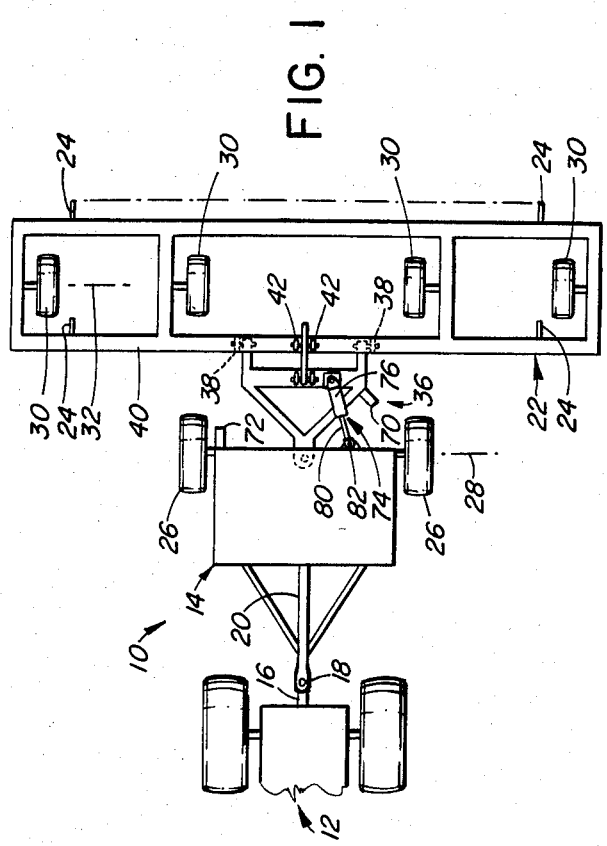
FIG. 1 shows in plan view an implement train incorporating the hitch assembly of the present invention.

FIG. 1 shows in plan view a typical train of agricultural implements in which the hitch of the present invention would have application. The units of the train are shown in block form, without detailed representation, since the actual implements or units used could vary from train to train. Also, while the illustrated train reflects a towing situation as the environment for the present invention, it would be possible to have the train in a "pushing" configuration and still obtain the benefits of the present invention.

The train 10 as shown in FIG. 1 includes a main or towing unit 12 such as a tractor. A first, or intermediate unit or implement 14 is shown as connected to the hitch 16 of the tractor at a connection point 18 by a towbar 20. The hitch connection at 18 is of a conventional nature and need not be described in detail. Also, the intermediate unit could be of any type and need not be described in detail, although it could be, for example, a pneumatic seeder trailer.

Figure 2:
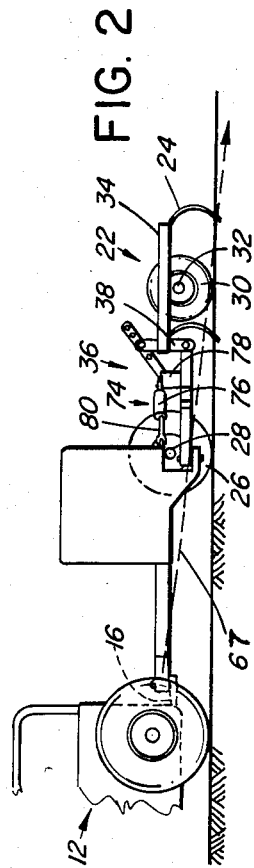
FIG. 2 shows the implement train of FIG. 1 in elevation.

The intermediate unit 14 is shown as towing a primary unit 22 which could be, for example a cultivator unit having ground-engaging cultivator shanks or implements 24 (FIG. 2). Both units are supported by ground-engaging wheels, unit 14 by wheels 26 rotatable about a first transverse axis 28 and unit 22 by wheels 30 rotatable about a second transverse axis 32. Unit 22 includes a frame 34 which mounts the wheels 30 and the implements 24 in any conventional fashion, the details of which do not form a part of the present invention.

The present invention is concerned with a hitch assembly for connecting the primary unit 22 to the intermediate unit 14 in the train of agricultural implements. The hitch 36 is shown in each of the figures of the drawings although reference to FIGS. 3 or 4 will show the details thereof.

The hitch assembly of the first embodiment of the present invention (FIG. 3) includes a pair of transversely spaced apart first links or arms 38 which extend downwardly from the foremost transverse member 40 of the primary implement frame 34. Second links or lugs 42 extend upwardly from the member 40 and are closely spaced apart so as to straddle the draft line (usually the center line) of the primary unit 22.

A drawbar 44 includes a generally triangular transverse section made up of a base member 46 and a pair of forwardly converging side members 48 which meet at an apex from which a connection lug 50 extends forwardly along the draft line. Lug 50 has appropriate means such as a vertically oriented bore 52 which can be connected to appropriate hitch means on the intermediate unit as will be described hereinafter.

A pair of transversely spaced apart lugs 54 extend rearwardly from the base member 46 and each is pivotally connected to a corresponding first link or arm 38 as by a removable pivot pin 56. With this connection the drawbar 44 can pivot vertically relative to the frame 34 of the primary unit about the axis extending transversely between the pivot pins 56.

The drawbar 44 may be adjustably set at a desired angular orientation relative to the primary unit by an adjustable third link which includes a pair of transversely spaced apart lugs or ears 58 straddling the draft line and projecting upwardly from the base member 46, and an adjustment link 60. Link 60 is pivotally connected at one end between and to the ears 58 by a pivot pin 62. Towards the other end the link 60 has a plurality of adjustment holes 64 any one of which can receive a removable pin 66 supported in the second link lugs 42. By selecting an appropriate hole 64 to receive the pin 66 it is possible to constrain the drawbar 44 to a desired angle relative to the primary unit frame 34.

With reference now to FIG. 2, two important constraints concerning the hitch assembly of this invention will be described. First of all it is very desirable that the connection point of the drawbar 44, e.g. bore 52 as illustrated, be at a level which is on or closely adjacent to the transverse axis 28 of the intermediate unit wheels 26. In practical terms, since an axle may extend across the intermediate unit it is likely that the connection point will be below the axle and hence below the axis 28. Secondly the connection point 52 lies on or closely adjacent to a reaction line 67 drawn from the connection point 18 to the area of the ground-engaging points of the implements 24 carried by the primary unit 22.

A third constraint, relating to the length of the assembly, is that the distance from the second axis 32 to the connection point 52 should be considerably less than the distance from the axis 28 to the connection point 18.

When the above constraints are generally met, it being understood that the three-dimensionality of real life parts will prevent absolute adherence to all three constraints, especially the third, a number of advantages to the assembly of the invention become apparent. Since the hitch assembly is relatively short it makes the train of units more visible and less cumbersome and drastically reduces the turning radius. The connection between the primary and intermediate units allows the primary unit to follow undulations in the ground more closely. It also reduces much of the vertical load placed on the intermediate unit due to the dynamic properties of the draft line. Finally the relative movement of the tractor and the intermediate unit are not transferred to the primary unit, due to the location of the connection point 52. This helps in maintaining an even working depth or height of the primary unit implements over rolling terrain.

Figure 3:
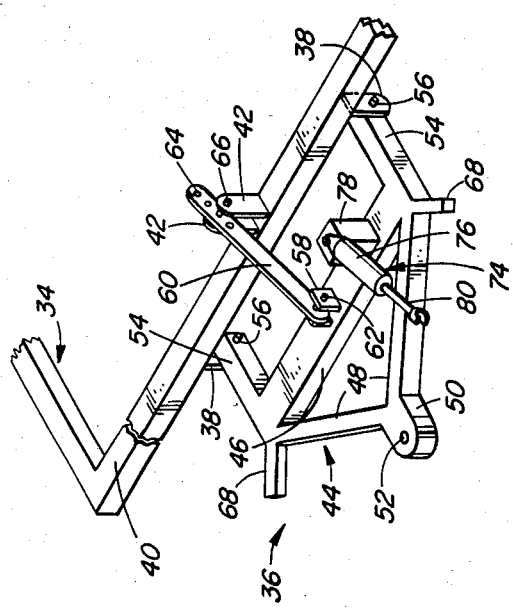
FIG. 3 shows in perspective a first embodiment of the hitch assembly of the present invention.

Certain items may be added to the aforementioned structure to aid in the operation thereof. With reference to FIG. 3, for example stops 68 may project outwardly from the side members 48, the stops being intended to abut the back of the intermediate unit in a turn so as to prevent contact between the drawbar 44 and one of the wheels 26. As an alternative to the two stops 68 shown on the drawbar the configuration of FIG. 1 could be used, wherein one stop 70 is provided on the drawbar, on one side thereof, and another stop 72 is provided on the intermediate unit itself.

FIGS. 1, 2 and 3 show another valuable addition to the present invention, namely damping cylinder assembly 74. The damping cylinder assembly 74 includes a cylinder 76 containing a suitable damping fluid, the cylinder 76 being pivotally connected to a lug 78 on the base member 46. The rod 80 slidably extending from the cylinder 76 is pivotally connected to the intermediate unit 14 at a suitable point such as 82 (FIG. 1). The damping cylinder assembly acts as a shock absorber to dampen erratic relative motion between the intermediate and primary units in both vertical and horizontal planes.

Figure 4:
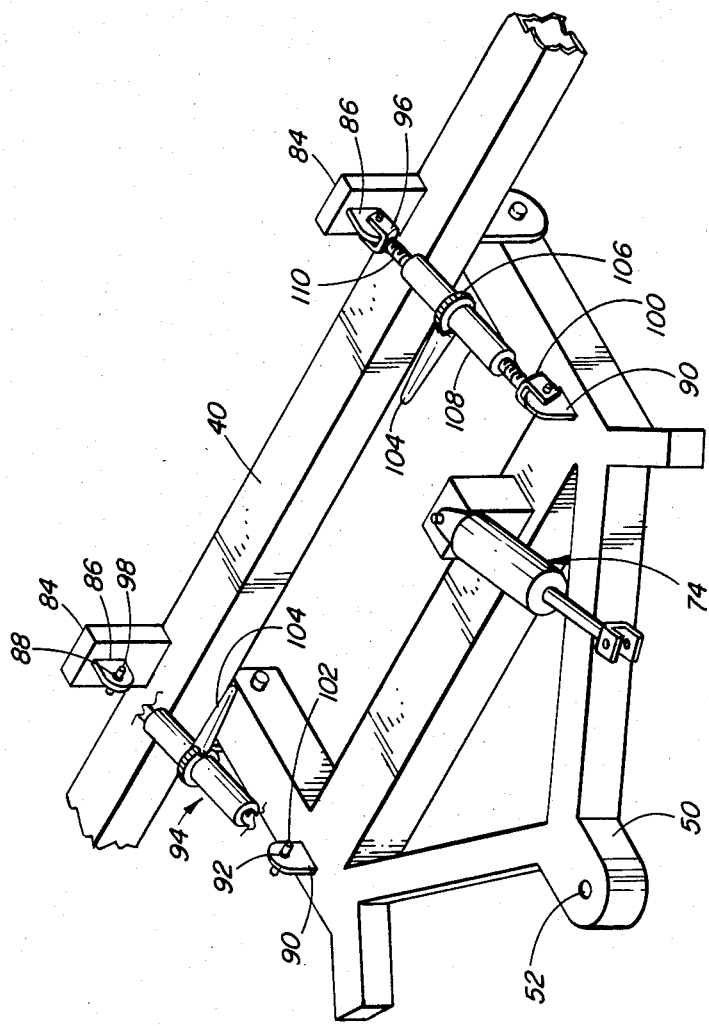
FIG. 4 shows in perspective a second embodiment of the hitch assembly of the present invention.

FIG. 4 illustrates a second embodiment of the present invention, similar to that of FIG. 3, but utilizing a different mechanism for adjusting the angle of the drawbar 44 relative to the frame 34. In this embodiment a pair of posts are welded to the frame member 40, each post being aligned with a corresponding one of the lugs 54. Projecting forwardly of each post 84 is an ear 86 provided with a through hole 88. Aligned with ear 86 is another ear 90 on the drawbar lug 54, having a through hole 92 therein. Extending between the ears 86 and 90 is a ratchet jack 94 in which the yoke 96 is pivotally attached to the ear 86 via the pivot pin 98 which passes through the hole 88 and in which the yoke 100 is pivotally attached to the ear 90 via the pivot pin 102 passing through the hole 92. Ratchet jacks are well known and hence it is not necessary to describe the structure thereof in detail. It is sufficient to point out that upon appropriate movement of the handle 104 the ratchet 106 will effect rotation of a nut within the main body relative to the threaded rod 110 to shorten or lengthen the jack, thereby altering the angle of the drawbar 44 relative to the frame 34. Both ratchet jacks will preferably be adjusted by the same amount but should there be any misalignment between the drawbar 44 and the frame 34 the jacks could be adjusted by slightly different amounts to compensate for such misalignment.

In the embodiments illustrated herein the adjusting mechanisms have been mounted above the hitch assembly and the drawbar has been connected to the frame 34 below the member 40. Should the configuration of the primary unit and/or the intermediate unit be such that such an assembly mode be impractical it would be possible to mount the adjusting mechanism below the hitch assembly and/or to pivotally attach the drawbar to the frame in the same plane as, or even above the frame, while still obtaining the beneficial results of the invention. Such configurations have not been specifically illustrated as they are readily perceivable from the illustrated embodiments.

The foregoing is intended to describe the best mode of putting the invention into effect known at the present time. It is understood that variations in the invention, without departing from the spirit thereof, could occur to a person skilled in this art. Accordingly the scope of protection to be afforded the present invention is to be determined from the claims appended hereto.

The embodiments of the invention in which an exclusive property or privilege is claimed are defined as follows:

1. A hitch assembly for use in connecting a primary wheeled unit to an intermediate wheeled unit in a train of units, said intermediate unit including a pair of ground-engaging wheels rotatable about a first transverse axis, and said primary unit including a frame mounting at least one ground-engaging element and a pair of ground-engaging wheels rotatable about a second transverse axis, said assembly comprising: first link means extending below said frame; second link means extending above said frame; drawbar means pivotally connected at one end to said first link means and having connection means at the other end thereof for pivotable connection to said intermediate unit at a point which is both on or closely adjacent to said first axis and is located on or closely adjacent to a reaction line drawn from a connection point for said intermediate unit in the train to the ground-engagement area of said element; and third link means pivotally connected to said drawbar means and to said second link means for fixing the angular relation between said frame and said drawbar means.

2. A hitch assembly according to claim 1 wherein the distance from said second axis to the connection point of said primary unit with said intermediate unit is substantially less than the distance from said first axis to said connection point of said intermediate unit in the train.

3. A hitch assembly according to claim 2 wherein said first link means comprises a pair of transversely spaced apart arms and said drawbar means comprises a transverse generally triangular section having a base and a pair of sides converging from the base to an apex, a pair of spaced apart lugs extending outwardly normal to said base and each pivotally connected to a corresponding one of said arms, and a connection lug extending outwardly from said apex and carrying said connection means at the free end thereof.

4. A hitch assembly according to claim 3 wherein said second link means includes a pair of closely spaced apart adjustment lugs straddling the draft line of said primary unit, and said third link means includes an adjustment arm pivotally connected at one end to said base, extending to between said pair of adjustment lugs and carrying adjacent the other end thereof means for adjustable connection to said pair of adjustment lugs such that the length of said adjustment arm and hence the angular relation between said drawbar means and said frame can be altered.

5. A hitch assembly according to claim 3 wherein said second link means includes a pair of adjustment lugs, each being generally vertically aligned with a corresponding one of said arms, and said third link means includes a pair of adjustment arms each being pivotally connected at one end to a corresponding one of said adjustment lugs and at the other end to said base.

6. A hitch assembly according to claim 5 wherein each of said adjustment arms is a longitudinally adjustable ratchet jack.

7. A hitch assembly according to claim 4 or 5 including a stop bar extending outwardly from each side of said triangular section adjacent said base for limiting transverse angular rotation of said primary unit relative to said intermediate unit through engagement with a corresponding portion of said intermediate unit.

8. A hitch assembly according to claim 4 and including damping cylinder means connectable between said drawbar means and said intermediate unit for damping vertical and transverse motions of said primary unit relative to said intermediate unit.

9. A hitch assembly according to claim 5 and including damping cylinder means connectable between said drawbar means and said intermediate unit for damping vertical and transverse motions of said primary unit relative to said intermediate unit.

10. A hitch assembly for use in connecting a primary wheeled implement to an intermediate wheeled implement in an implement train, said intermediate implement having a pair of ground-engaging wheels rotatable about a first transverse axis, and said primary implement including a frame carrying at least one ground-engaging element and mounting a pair of ground-engaging wheels rotatable about a second axis, said assembly comprising: first link means extending vertically below said frame; a drawbar pivotally connected at one end to said link means and extending away therefrom, said drawbar having connection means at the other end thereof for pivotable connection to said intermediate element at a point on or closely adjacent to said first axis, the distance from said second axis to said connection point being substantially less than the distance from said first axis to a connection point for said intermediate implement in the train such that the connection point for said primary implement is on or closely adjacent to a line drawn from the connection point for said intermediate element to the ground engagement area of said element; second link means extending vertically above said frame; third link means pivotally connected at one end to said drawbar and adjustably connected adjacent the other end thereof to said second link means for adjustment of the angular relation between said frame and said drawbar; and stop means on said drawbar for limiting the transverse angular rotation of said primary implement relative to said intermediate implement.

11. A hitch assembly according to claim 10 wherein said first link means comprises a pair of transversely spaced apart arms, and said drawbar includes a transverse generally triangular section having a base and a pair of sides converging from the base to an apex, a pair of spaced apart lugs extending outwardly normal to the base and each pivotally connected to a corresponding one of said arms, and a connection lug extending outwardly from said apex and carrying said connection means at the free end thereof.

12. A hitch assembly according to claim 11 wherein said second link means includes a pair of closely spaced apart adjustment lugs straddling the draft line of said primary implement, the pivotal connection of said third link means being with said base and said adjustable connection of said third link means being with the free end of said adjustment lugs, said other end of said third link means being receivable between said adjustment lugs.

13. A hitch assembly according to claim 12 wherein said second link means includes a pair of adjustment lugs, each being generally vertically aligned with a corresponding one of said arms, and said third link means includes a pair of adjustment arms each being pivotally connected at one end to a corresponding one of said adjustment lugs and at the other end to said base.

14. A hitch assembly according to claim 13 wherein each of said adjustment arms is a longitudinally adjustable ratchet jack.

15. A hitch assembly according to claim 12 wherein said stop means includes a stop bar extending outwardly from each side of said triangular section adjacent said base and engagable with corresponding portions of said intermediate implement for limiting said angular rotation.

16. A hitch assembly according to claim 13 wherein said stop means includes a stop bar extending outwardly from each side of said triangular section adjacent said base and engagable with corresponding portions of said intermediate implement for limiting said angular rotation.

17. A hitch assembly according to claim 12 and including damping cylinder means connectable between said base of said drawbar and said intermediate implement for damping vertical and transverse motions of said primary implement relative to said intermediate implement.

18. A hitch assembly according to claim 13 and including damping cylinder means connectable between said base of said drawbar and said intermediate implement for damping vertical and transverse motions of said primary implement relative to said intermediate implement.

19. A hitch assembly for use in connecting a primary wheeled unit to an intermediate wheeled unit in a train of units, said intermediate unit including a pair of ground engaging wheels rotatable about a first transverse axis, and said primary unit including a frame mounting at least one ground-engaging element and a pair of ground-engaging wheels rotatable about a second transverse axis, said assembly comprising: drawbar means pivotally connected at one end to said frame and having connection means at the other end thereof for pivotable connection to said intermediate unit at a point which is both on or closely adjacent to said first axis and is located on or closely adjacent to a reaction line drawn from a connection point for said intermediate unit in the train to the ground-engagement area of said element; fixed link means extending vertically from said frame; and adjustable link means pivotally connected to said drawbar means and to said fixed link means for fixing the angular relation between said frame and said drawbar means.

* * * * *